United States Patent [19]
Fox

[11] Patent Number: 5,335,041
[45] Date of Patent: Aug. 2, 1994

[54] EXPOSURE AND FOCUS SYSTEM FOR A ZOOM CAMERA

[75] Inventor: Myron E. Fox, Spencerport, N.Y.

[73] Assignee: Eastman Kodak Company, Rochester, N.Y.

[21] Appl. No.: 120,994

[22] Filed: Sep. 13, 1993

[51] Int. Cl.$^5$ ............... G03B 7/091; G03B 13/36; G03B 15/03
[52] U.S. Cl. ................... 354/402; 354/414; 354/419; 354/422; 354/443
[58] Field of Search ............... 354/402, 413, 414, 419, 354/420, 421, 422, 443

[56] References Cited

U.S. PATENT DOCUMENTS

| | | |
|---|---|---|
| 4,295,715 | 10/1981 | Breen ............... 354/25 |
| 4,345,825 | 8/1982 | Matteson et al. ............... 354/23 D |
| 4,354,748 | 10/1982 | Grimes et al. ............... 354/23 D |
| 4,684,995 | 8/1987 | Baumeister ............... 354/402 |
| 4,727,389 | 2/1988 | Raschke ............... 354/402 |
| 5,017,955 | 5/1991 | Kotani ............... 354/400 |

Primary Examiner—W. B. Perkey
Attorney, Agent, or Firm—Roger A. Fields

[57] ABSTRACT

A light-sensitive, zone focus, passive automatic focus-/automatic exposure system for a zoom camera receives light level data and selects flash status, lens focus distance, and exposure setting such that flash illumination is provided at a light level greater than necessary to prevent underexposure but sufficient to provide fill-flash based only on the detected light level. A no-flash mode is provided in which exposure times are increased rather than activating the flash.

10 Claims, 3 Drawing Sheets

| FOCAL LENGTH-mm | PARAMETER | LIGHT LEVEL INTERVALS - TURNING POINT (TP) | | | | | |
|---|---|---|---|---|---|---|---|
| | | LESS THAN TP1 | FROM TP1 TO TP2 | FROM TP2 TO TP3 | FROM TP3 TO TP4 | FROM TP4 TO TP5 | GREATER THAN TP5 |
| 26.0 | f/# (APERTURE #) | 8.1(3) | 10.2(4) | 10.2(4) | 10.2(4) | 10.2(4) | 10.2(4) |
| | FLASH ON/OFF | ON | ON | OFF | OFF | OFF | OFF |
| | FOCUS DISTANCE - ft | 7.5 | 11.5 | 11.5 | 11.5 | 11.5 | 11.5 |
| | SHUTTER TIME - ms | 10 | 10 | 10 | 10 | 10 | 10 |
| 32.7 | f/# (APERTURE #) | 10.2(3) | 10.2(3) | 12.8(4) | 12.8(4) | 12.8(4) | 12.8(4) |
| | FLASH ON/OFF | ON | ON | ON | OFF | OFF | OFF |
| | FOCUS DISTANCE - ft | 7.5 | 11.5 | 11.5 | 11.5 | 11.5 | 11.5 |
| | SHUTTER TIME - ms | 10 | 10 | 10 | 10 | 10 | 10 |
| 38.2 | f/# (APERTURE #) | 9.8(2) | 11.9(3) | 11.9(3) | 11.9(3) | 15.0(4) | 15.0(4) |
| | FLASH ON/OFF | ON | ON | OFF | OFF | OFF | OFF |
| | FOCUS DISTANCE - ft | 7.5 | 11.5 | 11.5 | 11.5 | 11.5 | 11.5 |
| | SHUTTER TIME - ms | 10 | 10 | 10 | 10 | 10 | 10 |
| 43.4 | f/# (APERTURE #) | 11.2(2) | 11.2(2) | 13.5(3) | 13.5(3) | 13.5(3) | 17.0(4) |
| | FLASH ON/OFF | ON | ON | ON | OFF | OFF | OFF |
| | FOCUS DISTANCE - ft | 7.5 | 7.5 | 10 | 11.5 | 11.5 | 11.5 |
| | SHUTTER TIME - ms | 13 | 13 | 10 | 10 | 10 | 10 |
| 48.0 | f/# (APERTURE #) | 11.1(1) | 11.1(1) | 11.1(1) | 14.9(3) | 14.9(3) | 18.8(4) |
| | FLASH ON/OFF | ON | ON | ON | ON | OFF | OFF |
| | FOCUS DISTANCE - ft | 7.5 | 7.5 | 7.5 | 11.5 | 11.5 | 11.5 |
| | SHUTTER TIME - ms | 13 | 13 | 13 | 10 | 10 | 10 |

FIG. 3

| FOCAL LENGTH - mm | PARAMETER | LIGHT LEVEL INTERVALS - TURNING POINT TO TURNING POINT (TP) | | | | | |
|---|---|---|---|---|---|---|---|
| | | LESS THAN TP1 | FROM TP1 TO TP2 | FROM TP2 TO TP3 | FROM TP3 TO TP4 | FROM TP4 TO TP5 | GREATER THAN TP5 |
| 26.0 | f/# (APERTURE #) | 8.1(3) | 10.2(4) | 10.2(4) | 10.2(4) | 10.2(4) | 10.2(4) |
| | FLASH ON/OFF | OFF | OFF | OFF | OFF | OFF | OFF |
| | FOCUS DISTANCE - ft | 7.5 | 11.5 | 11.5 | 11.5 | 11.5 | 11.5 |
| | SHUTTER TIME - ms | 20 | 20 | 10 | 10 | 10 | 10 |
| 32.7 | f/# (APERTURE #) | 10.2(3) | 10.2(3) | 12.8(4) | 12.8(4) | 12.8(4) | 12.8(4) |
| | FLASH ON/OFF | OFF | OFF | OFF | OFF | OFF | OFF |
| | FOCUS DISTANCE - ft | 7.5 | 7.5 | 11.5 | 11.5 | 11.5 | 11.5 |
| | SHUTTER TIME - ms | 25 | 25 | 25 | 10 | 10 | 10 |
| 38.2 | f/# (APERTURE #) | 9.8(2) | 11.9(3) | 11.9(3) | 11.9(3) | 15.0(4) | 15.0(4) |
| | FLASH ON/OFF | OFF | OFF | OFF | OFF | OFF | OFF |
| | FOCUS DISTANCE - ft | 7.5 | 11.5 | 11.5 | 11.5 | 11.5 | 11.5 |
| | SHUTTER TIME - ms | 25 | 25 | 25 | 10 | 10 | 10 |
| 43.4 | f/# (APERTURE #) | 11.2(2) | 11.2(2) | 13.5(3) | 13.5(3) | 13.5(3) | 17.0(4) |
| | FLASH ON/OFF | OFF | OFF | OFF | OFF | OFF | OFF |
| | FOCUS DISTANCE - ft | 7.5 | 7.5 | 11.5 | 11.5 | 11.5 | 11.5 |
| | SHUTTER TIME - ms | 20 | 20 | 20 | 10 | 10 | 10 |
| 48.0 | f/# (APERTURE #) | 11.1(1) | 11.1(1) | 11.1(1) | 14.9(3) | 14.9(3) | 18.8(4) |
| | FLASH ON/OFF | OFF | OFF | OFF | OFF | OFF | OFF |
| | FOCUS DISTANCE - ft | 7.5 | 7.5 | 7.5 | 11.5 | 11.5 | 11.5 |
| | SHUTTER TIME - ms | 20 | 20 | 20 | 20 | 10 | 10 |

FIG. 4

EXPOSURE AND FOCUS SYSTEM FOR A ZOOM CAMERA

BACKGROUND OF THE INVENTION

1. Field of the Invention

This invention relates generally to photographic cameras and, more particularly, to passive automatic focus/automatic exposure systems for cameras.

2. Description of the Related Art

Cameras that require no adjustments from users before taking photographs are very. inexpensive and easy to use, and therefore are quite popular with consumers. These cameras often have a fixed lens focus distance, shutter speed, and aperture diameter. For improved picture-taking with no loss in convenience, consumers typically purchase flash-equipped cameras with variable focus, shutter, and aperture mechanisms and automatic exposure and automatic focus systems. Automatic exposure systems detect the amount of ambient light in the photographic scene and adjust one or more exposure parameters such as shutter speed, aperture opening, and flash setting to obtain optimal exposures for the detected light level. Automatic focus systems typically include ranging systems that determine the distance from the camera to a subject and automatically set the focus of the camera objective lens in accordance with the determined distance. Generally, the distance to the subject can be measured by a light- or sound-emitting system, comprising an active system, or the distance can be measured by the ambient light received from the photographic scene, comprising a passive, split-image rangefinder system.

Active ranging systems generally provide good accuracy, but require relatively expensive components, including an emitter that produces a beam of energy directed into a photographic scene, a beam receiver that detects the reflected beam from a subject in the scene, and a control system that provides power to the emitter and processes information from the beam receiver to determine the distance to the subject. These systems add cost and increase the difficulty of packaging the camera components into a compact camera size. Passive split-image rangefinder systems can require complex data manipulation and correlation functions to make the calculations necessary to convert received ambient light levels into object distances. Sophisticated cameras that provide both automatic lens focus and exposure control features are very convenient to use and provide good results, but can be rather complex and expensive. See, for example, U.S. Pat. No. 4,345,825 to Matteson and U.S. Pat. No. 5,017,955 to Kotani.

Cameras that provide the benefits of automatic exposure and automatic focus without the complexity and expense of more sophisticated ranging systems are desirable. For example, U.S. Pat. No. 4,710,013 to Wong assigned to W. Haking Enterprises of Hong Kong describes a camera with a relatively simple passive automatic focus and automatic exposure capability in which the ambient light level is detected as being one of two levels and limited camera adjustments are made accordingly. A detected lower light level places the camera in a flash mode in which a flash unit is activated and lens focus distance is set to a minimum setting with maximum aperture, and a higher light level places the camera in a daylight mode in which the flash unit is turned off and the lens focus distance is set to a maximum setting with minimum aperture.

Although an automatic lens focus and automatic exposure control system such as described in the Haking patent is not excessively complex and expensive and also generally provides satisfactory photographs, it would be desirable to provide greater adjustment capability without the relatively great complexity and expense of the other systems described above. For example, with only two light levels from which to index camera adjustments, somewhat incorrectly exposed exposures can be produced, especially in high contrast situations. Greater exposure parameter adjustment would help provide exposures that are more evenly illuminated.

From the discussion above, it should be apparent that there is a need for a relatively simple and inexpensive automatic lens focus and automatic exposure control system that provides quick, relatively accurate lens focus distance setting and improved exposure under a variety of lighting conditions. The present invention fulfills this need.

SUMMARY OF THE INVENTION

The present invention provides an automatic focus/automatic exposure system for use in a photographic camera that takes photographs of a scene and includes a flash unit operable in a flash on or flash off status, an objective lens having a variable focus distance, and a shutter/aperture combination adapted for adjustment through a range of exposure settings comprising shutter times and aperture diameters to produce an exposure, the system comprising:

a light level detecting system that receives ambient light from the scene and produces a light signal representative of the amount of received light;

a controller that receives the light signal and determines a lens focus distance, flash unit status, and exposure setting in accordance with the received light signal value and controls the focus distance of the objective lens, the flash unit status, and the setting of the shutter/aperture combination in accordance with such determinations; and a program table memory providing data to the controller and having data elements addressed by light signal value, each data element storing lens focus distance data for setting the lens focus distance at one of a plurality of distance zones, flash unit status data for setting the flash unit status, aperture data for setting the aperture size, and shutter time data for setting the shutter open time, such that the flash unit status is changed from off to on at a predetermined light signal value without a corresponding change in lens focus distance.

The light level at which the flash unit is turned on and the lens focus distance is held unchanged is selected such that tile flash unit provides lighting to eliminate shadows without changing the overall exposure. In this way, for example, the flash unit can be activated at a subject distance under conditions where it can provide a more pleasing exposure under high contrast conditions. That is, the flash unit can be activated before necessary to prevent underexposure and at a subject distance greater than is conventional, improving the resulting exposure. The use of a program table memory helps reduce the cost of achieving such improvements.

In another aspect of the invention, the system includes a user-operable flash selection switch operable between a flash setting and a no-flash setting, and the table memory data includes data elements addressed by light signal level for setting the exposure at different values depending on the setting of the flash selection switch. With the flash selection switch set to the flash setting, the flash unit status is set in accordance with tile table memory so the flash unit is automatically activated. When the flash selection switch is set to the no-flash setting, the data elements selected from tile table memory are such that the flash unit status is always set to off and the flash unit is never activated. In addition, the selected data elements increase the shutter open times as compared to the data elements where the flash unit would otherwise have been activated. This provides a simplified automatic focus/automatic exposure control system that produces optimal exposures when flash is not desired.

Other features and advantages of the present invention should be apparent from the following description of the preferred embodiments, which illustrate, by way of example, the principles of the invention.

BRIEF DESCRIPTION OF THE DRAWINGS

FIG. 3 is a chart showing the values entered in the first program memory table illustrated in FIG. 2.

FIG. 4 is a chart showing the values entered in the second program memory table illustrated in FIG. 2.

DESCRIPTION OF THE PREFERRED EMBODIMENT

Figure 1:
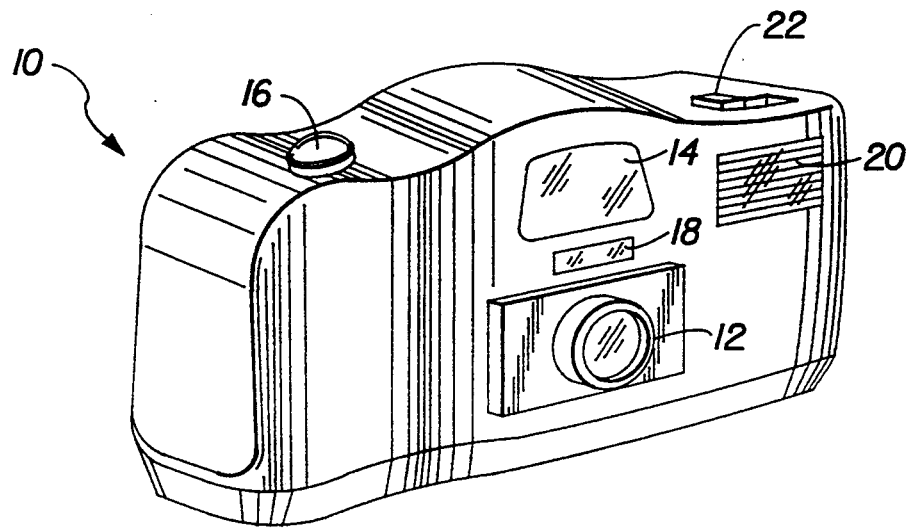
FIG. 1 is a perspective view of a camera constructed in accordance with the present invention.

With reference to FIG. 1, a camera 10 constructed in accordance with the present invention includes an objective lens 12 that directs light from an ambient scene to a photographic film plane (not illustrated) in the camera to expose an image onto photographic film. The camera also includes a viewfinder 14 through which a camera user views the ambient scene and frames the exposure to be produced. A shutter button 16 is operated by the camera user to initiate production of an exposure. A light-detecting sensor 18 detects the camera-received ambient light level in the scene. A flash unit 20 provides auxiliary lighting under certain conditions and a flash selection switch 22 is operable between a flash setting and a no-flash setting to control the flash lighting. The lens 12 is a zoom lens that can be set to one of five focal lengths, which are selected by the camera user with a zoom switch 24. The camera includes a light level, automatic zone focus and automatic exposure system that detects light level through the sensor 18 and selects parameters for flash unit status, lens focus distance, and exposure setting based on the light level detected by the sensor. The light level transition at which the flash unit status is changed from off to on is different from the light level transition at which the lens focus distance is changed, which permits better tailoring of exposure parameters. In this way, the flash unit can be activated at a light level and focus distance greater than necessary to prevent underexposure but sufficient to eliminate shadows in high contrast lighting conditions, thereby producing better quality exposures, while making use of a simplified, light-level-type automatic focus and automatic exposure system.

Figure 2:
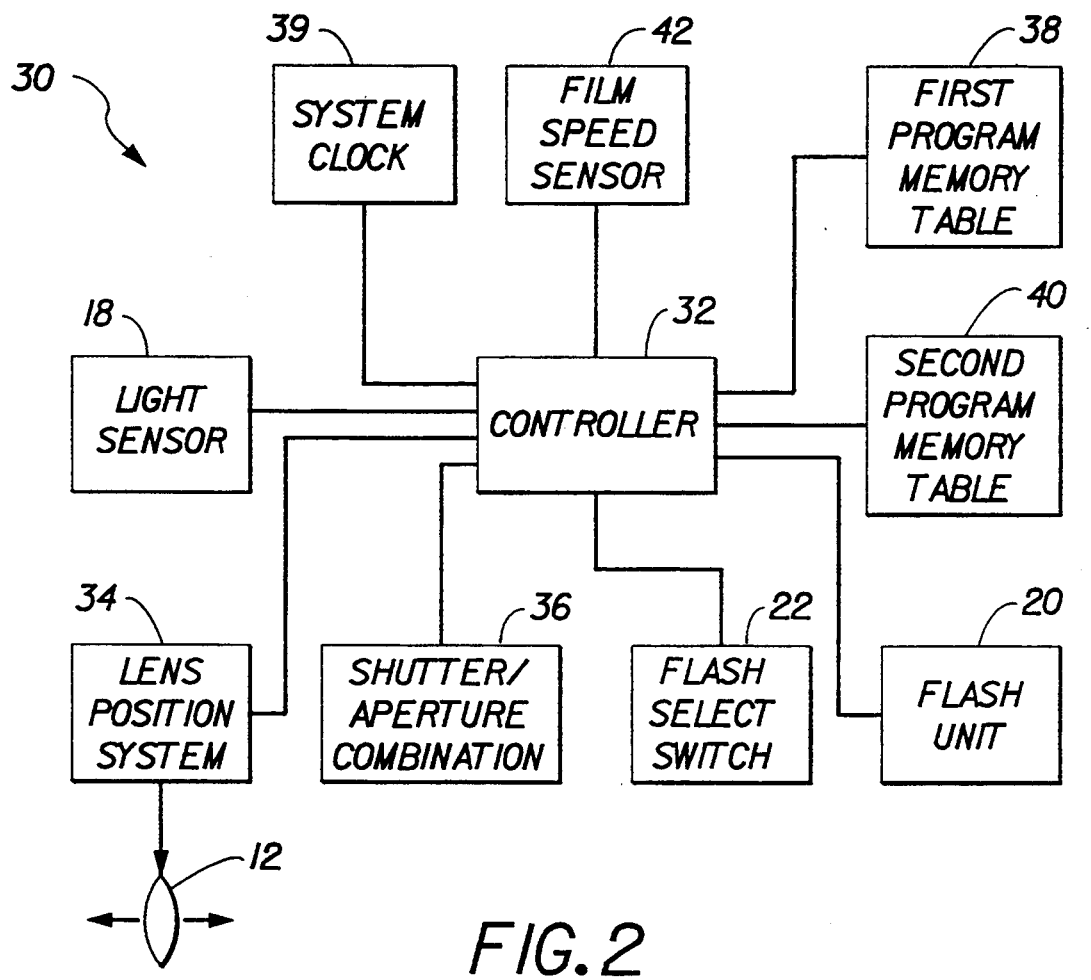
FIG. 2 is a block diagram of the automatic focus-/automatic exposure system of the camera illustrated in FIG. 1.

FIG. 2 is a block diagram of the automatic focus-/automatic exposure system 30 of the camera 10. The light-detecting sensor 18 detects the ambient light level received by the camera, as noted above, and produces a light signal that is representative of the amount of received light. The light signal is provided to a controller 32 over a signal line 33. When the shutter button 16 is pressed, the controller adjusts the focus distance of the objective lens 12 through a lens-positioning system 34, controls the flash unit 20 to automatically provide flash illumination when set to an "on" status, and sends an exposure setting signal to a shutter/aperture combination 36.

The controller 32 obtains the lens focus distance data, flash unit status data, and exposure setting data from a first program memory table 38 having data elements addressed by light signal level. The exposure setting data, for example, includes information such as shutter open time data and aperture diameter setting data. The memory table comprises a digital memory device and therefore provides digital data to the controller 32. In contrast, the remaining components such as the light detecting sensor 18, lens positioning system 34, and shutter/aperture combination 36 can be analog devices. The controller therefore is provided with pulses from a system clock 39 to extract the digital data from the table. Storing the exposure parameters as entries in a table permits selection of optimal combinations of settings at relatively low cost.

FIG. 3 illustrates the entries of the program memory table 38 of the preferred embodiment. The program memory table is indexed by a plurality of light level intervals. Each light level interval has corresponding entries for lens focus distance, flash status, shutter open time, and aperture diameter. In the preferred embodiment, the table 38 is provided with five turning points, or transitions, that define six light level intervals.

As can be seen from the table of FIG. 3, the controller 32 controls the lens positioning system 34 to set the lens 12 at one of five focal lengths selected by the camera user. At each focal length, the controller selects picture-taking parameters in accordance with the light level detected by the sensor 18. In particular, the controller selects an aperture opening for the shutter/aperture combination 36 corresponding to an f-stop number, selects a flash status for the flash unit 20, selects a focus distance for the lens 12, and selects a shutter open time for the shutter/aperture combination 36. As can be seen from the table, the five light level turning points are indicated as TP1 through TP5. For example, when the light level detected by the light-detecting sensor 18 increases from a light level signal value less than TP1 to a value greater than TP1, then the f-stop is changed from f/8 to f/10.6. Similarly, at the same turning point, the focus distance for the lens 12 is changed from 7.5 feet (2.3 meters) to 11.5 feet (3.5 meters).

In general, the system 30 assumes that a greater light level corresponds to an outdoor scene, implying greater distances, and assumes that a lower light level corresponds to an indoor scene, implying shorter camera-to-subject distances. Thus, greater light level values are associated with greater focus distances and lesser light level values are associated with lesser focus distances. Exposure setting and flash status are changed accordingly, as well.

With respect to at least one pair of adjacent light level intervals, the program memory table 38 has table entries such that the flash status is changed while the lens focus distance is held constant. In particular, the lens focus distance is set to one of two distances for any focal length selected by a user and the flash unit 20 status is changed from off to on at a light signal turning point different from that used to change the focus distance. For example, at a user-selected lens focal length of 26.0 mm in the table of FIG. 3, the flash unit status is changed from off to on when the light signal value changes from greater than TP2 to less than TP2, but lens focus distance remains constant at 11.5 feet (3.5 meters). Shutter open time and aperture stop also remain constant at 10.0 msec and f/10.6, respectively. Lens focus distance is not changed until the light signal value drops below TP1. At a user-selected focal length of 48.0 mm, the flash unit 20 status is changed from off to on when the light signal value changes from greater than TP4 to less than TP4 but lens focus distance remains constant until the light signal value drops below TP3.

Conventional passive light-level, zone automatic focus/automatic exposure systems such as the related art discussed above change lens focus distance and flash status simultaneously at a light level where the change is necessary to prevent underexposure. The present invention, however, changes flash unit status to provide flash at a light level greater than that necessary to prevent underexposure, and changes focus distance at a different light level, to eliminate shadows under daylight photographic conditions using a typical ISO 100 photographic film. Such flash illumination provides what is commonly referred to as a fill flash function. Comparatively sophisticated control systems can provide such a function, but typically do so with much greater complexity and expense. See, for example, the related art discussed above. The present invention provides such a function with a relatively simple automatic focus and automatic exposure system that operates solely on the basis of detected ambient light level.

To further simplify the system 30, only four aperture diameters are possible. The aperture diameters are indicated in the table as either 1, 2, 3, or 4 enclosed within parenthesis following the f-stop number. These aperture diameters correspond to approximately 4.3 mm, 3.8 mm, 3.2 mm, and 2.5 mm, respectively. Thus, the controller 32 selects the aperture diameter for the shutter/aperture combination 36 from a predetermined number of diameters. Restricting the number of diameters at which the shutter/aperture combination can be set simplifies the construction of the combination and therefore reduces cost. The table of FIG. 3 also shows that each aperture diameter has associated with it only one exposure time. For example, aperture diameter numbers 1 and 2 are associated with an exposure time of 13.0 msec while aperture diameter numbers 3 and 4 are associated with exposure times of 10.0 msec. Permitting only one exposure time per aperture diameter reduces cost as compared with a system that permits multiple times for each aperture diameter.

In another aspect of the invention, the automatic focus/automatic exposure system 30 includes a second program memory table that also is indexed by a plurality of light levels. A preferred embodiment of a second program memory table 40 in accordance with the invention is illustrated in FIG. 4. The second memory table 40 is similar to the first program memory table 38 except that the controller 32 selects entries from the second table only when the flash selection switch 22 is placed in the "no-flash" position. With the flash selection switch set to the "no-flash" setting, the flash unit 20 is never activated and the data elements in the second table are arranged such that the shutter open time is increased where the flash unit status otherwise would have been changed to "on". This is illustrated in the FIG. 4 table.

By implementing the second program memory table 40, the automatic focus/automatic exposure system 30 provides optimal exposures in a simplified automatic focus system when flash illumination is not desired. Thus, the system still utilizes the light level signals as produced by the light-detecting sensor 18. For example, at a focal length of 26.0 mm, the entries in the second table 40 are arranged such that the shutter open time is changed from 10.0 msec to 20.0 msec when the light level detected by the light-detecting sensor 18 changes from greater than TP2 to less than TP2 but lens focus distance remains constant. This change in light level corresponds to the light level at which entries in the first data table 38 indicated that the flash unit 20 status should be changed to on so the flash unit would be activated. In the second table 40 illustrated in FIG. 4, for a user-selected focal length of 48.0 mm, the shutter open time is changed from 10.0 msec to 20.0 msec when the light level changes from greater than TP4 to less than TP4 but lens focus distance remains constant until the light signal value drops below TP3. The second program memory table provides additional exposure flexibility with little increase in cost and complexity.

Thus, operation of the system 30 using the second table 40 of FIG. 4 is analogous to operation using the first table 38 of FIG. 3 except that, rather than turning on the flash unit 20, the system operates with the second table such that flash unit status remains off and the shutter open time is increased to permit increased light to fall on the photographic film when producing an exposure. Again, the increased shutter open time and light occur at a light level greater than would be necessary to prevent underexposure but sufficient to provide a more pleasing exposure.

The preferred embodiment includes a shutter/aperture combination 36 comprising a separate shutter blade and aperture diaphragm construction. Those skilled in the art, however, will recognize that other constructions can be used without departing from the teachings of the present invention. For example, a shutter/aperture combination referred to as a programmed shutter can be used, in which shutter blades are opened up to a maximum opening size, remain open for a predetermined time, and then are closed to provide an equivalent shutter open time and f-stop that otherwise would be provided by a separate shutter and aperture diaphragm construction. The diameter of the programmed shutter and the time during which it is open do not necessarily equal the diameter and time of the equivalent f-stop and shutter open time of an independent shutter and diaphragm. In addition, table entries might be modified as a function of the rated light sensitivity, or film speed, of the photographic film loaded in the camera 10. Therefore, the system 30 can include a film speed sensor 42 that is either set manually by the camera user or automatically reads a code on a film cartridge that indicates film speed.

The present invention has been described above in terms of a presently preferred embodiment so that an understanding of the present invention can be conveyed. There are, however, many configurations for automatic focus and automatic exposure systems not specifically described herein, but with which the present invention is applicable. The present invention should therefore not be seen as limited to the particular embodiment described herein, but rather, it should be understood that the present invention has wide applicability with respect to automatic focus/automatic exposure systems generally. All modification, variations, or equivalent arrangements that are within the scope of the attached claims therefore should be considered within the scope of the invention.

The following elements and their corresponding reference numerals are used in the drawings:

camera 10
objective lens 12
viewfinder 14
shutter button 16
light-detecting sensor 18
flash unit 20
flash selection switch 22
zoom switch 24
automatic focus/automatic exposure system 30
controller 32
signal line 33
lens-positioning system 34
shutter/aperture combination 36
first program memory table 38
system clock 39
second program memory table 40
film speed sensor 42

I claim:

1. An automatic focus/automatic exposure system for use in a photographic camera that takes photographs of a scene and includes a flash unit operable in a flash on or flash off status, an objective lens having a variable focus distance, and a shutter/aperture combination adapted for adjustment through a range of exposure settings comprising shutter times and aperture diameters to produce an exposure, the system comprising:

a light level detecting system that receives ambient light from the scene and produces a light signal representative of the amount of received light;

a controller that receives the light signal and determines a lens focus distance, flash unit status, and exposure setting in accordance with the received light signal value and controls the focus distance of the objective lens, the flash unit status, and the setting of the shutter/aperture combination in accordance with such determinations; and a program table memory providing data to the controller and having data elements addressed by light signal value, each data element storing lens focus distance data for setting the lens focus distance at one of a plurality of distance zones, flash unit status data for setting the flash unit status, aperture data for setting the aperture size, and shutter time data for setting the shutter open time, such that the flash unit status is changed from off to on at a predetermined light signal value without a corresponding change in lens focus distance.

2. A system as defined in claim 1, further including a manual flash selector switch that can be switched to a non-flash setting such that the controller increases the shutter open time for data elements that otherwise would have a flash system setting of on.

3. A system as defined in claim 2, wherein the shutter/aperture combination comprises a separate shutter mechanism and an aperture mechanism.

4. A system as defined in claim 3, wherein the controller controls the shutter/aperture combination such that the shutter aperture diameter is selected from a predetermined number of diameters.

5. A system as defined in claim 4, wherein the shutter aperture diameters comprise four predetermined diameters.

6. A system as defined in claim 4, wherein the controller controls the shutter/aperture combination such that the controller selects only one predetermined shutter time for each aperture diameter regardless of changes in light level.

7. An automatic focus and automatic exposure system for use in a photographic camera that takes photographs of a scene and includes a flash unit, an objective lens having a variable focal length, and a shutter/aperture combination adapted for adjustment through a range of exposure settings comprising shutter times and aperture diameters to produce an exposure, the system comprising:

a light level detecting system that receives ambient light from the scene and produces a light signal representative of the amount of received light;

a controller that receives the light signal and selects a lens flash status, focus distance, shutter open time, and aperture diameter and controls the operation of the flash unit, lens, and shutter/aperture combination in accordance with the light signal value;

a first program table memory having data elements addressed by light signal level, each data element storing lens focus distance data for setting the lens focal length, aperture data for setting the aperture size, and shutter time data for setting the shutter open time, such that the light signal value at which the controller selects a different one of the predetermined lens focus distances is different from the light signal value at which the controller changes the flash status;

a second program table memory having data elements addressed by light signal level, each data element storing lens focus distance data for setting the lens focus distance, flash system status data for setting the flash system status, aperture data for setting the aperture size, and shutter time data for setting the shutter open time, such that the light signal value at which the controller selects a different one of the predetermined lens focus distances is different from the light signal value at which the controller selects a different one of the predetermined shutter open times;

a flash selector switch that can be set to a flash or no-flash status, wherein the controller selects data elements from the first table if the switch is set to flash and selects data elements from the second table if the switch is set to no-flash.

8. A camera for taking photographs of a scene, the camera comprising:

an objective lens unit having a variable focal length and focus distance lens and a lens positioning system for setting the lens at a user-selected focal length and a camera-selected focus distance;

a shutter/aperture combination operable to provide a range of exposure settings comprising shutter open times and aperture diameters to produce a photographic exposure;

a light level detecting system that receives ambient light from the scene and produces a light signal representative of the amount of received light;

a flash unit that provides flash illumination to the photographic scene;

a program table memory having data elements addressed by light signal value, each data element storing lens focal length data, flash unit status data, aperture data, and shutter time data; and a controller that receives the light signal from the light level detecting system and, in accordance with the light signal value, selects a lens focus distance from the table memory and controls the lens positioning system to set the lens focus distance at the selected focus distance and selects aperture data, shutter time data, and flash status data from the table memory and controls the flash unit status such that the flash unit status is changed from off to on at a predetermined light signal value different from the value at which the lens focus distance is changed.

9. A camera as defined in claim 8, wherein the program table memory contains data elements such that only one predetermined shutter time is possible for each aperture selected from the table memory.

10. A camera as defined in claim 8, wherein the camera further comprises a manual flash selector switch that can be switched to a non-flash setting such that the controller increases the shutter time for data elements that otherwise would have a flash unit status data from the memory table with an on setting.

* * * * *